United States Patent
Hausler et al.

(10) Patent No.: US 10,572,031 B2
(45) Date of Patent: *Feb. 25, 2020

(54) PROCESSING KEYBOARD INPUT TO CAUSE RE-SIZING OF ITEMS IN A USER INTERFACE OF A WEB BROWSER-BASED APPLICATION

(71) Applicant: salesforce.com, inc., San Francisco, CA (US)

(72) Inventors: Jesse Alan Hausler, Boulder, CO (US); Katherine Jeanne Rushton, Albany, CA (US); Gregory Pinto, Berkeley, CA (US); Michael M Pedersen, II, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 428 days.

This patent is subject to a terminal disclaimer.

(21) Appl. No.: 15/279,241

(22) Filed: Sep. 28, 2016

(65) Prior Publication Data

US 2018/0088763 A1    Mar. 29, 2018

(51) Int. Cl.
| | | |
|---|---|---|
| *G06F 3/023* | (2006.01) | |
| *G06F 3/0486* | (2013.01) | |
| *G06F 3/0489* | (2013.01) | |
| *G06F 3/0481* | (2013.01) | |

(52) U.S. Cl.
CPC ............ *G06F 3/023* (2013.01); *G06F 3/0481* (2013.01); *G06F 3/0486* (2013.01); *G06F 3/0489* (2013.01); *G06F 3/04892* (2013.01); *G06F 2203/04803* (2013.01)

(58) Field of Classification Search
CPC ....................... G06F 2203/04803; G06F 3/023
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| | (Continued) | |

OTHER PUBLICATIONS

Using your keyboard to control the mouse in Windows 7, abilitynet.org.uk Oct. 2008 (Year: 2008) (Year: 2008).*

(Continued)

*Primary Examiner* — William L Bashore
*Assistant Examiner* — Nathan K Shrewsbury
(74) *Attorney, Agent, or Firm* — Weaver Austin Villeneuve & Sampson LLP

(57) ABSTRACT

Disclosed are examples of systems, apparatus, methods and computer program products for causing re-sizing of items in a user interface of a web browser-based application. A bounding window of a web browser comprising a presentation of items can be caused to be displayed in a user interface on a display of a device. First keyboard input from a user interacting with a first item can be processed. A first edge of a first item can be caused to be transformed to a re-configurable state. Second keyboard input from the user interacting with the first item can be processed. A size of the first item can be caused to be changed by causing the first edge to move from a first relative position to a second relative position with respect to the other items displayed in the user interface.

20 Claims, 8 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,046,722 A | 4/2000 | McKiel, Jr. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,184,876 B1 | 2/2001 | Miller |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,856,333 B2 | 2/2005 | Ullman et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,509,592 B1 | 3/2009 | Martinez |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,847,677 B2 | 12/2010 | Ryan et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1* | 12/2011 | Hubbard ............... G06Q 30/02 707/736 |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,381,107 B2 | 2/2013 | Rottler et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,459,794 B1 | 10/2016 | Soegiono |
| 10,198,494 B2 | 2/2019 | Hausler et al. |
| 10,245,815 B2 | 4/2019 | Sheu et al. |
| 10,255,038 B2 | 4/2019 | Chudge et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1* | 4/2003 | Ramachandran ... G06F 3/04847 715/234 |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0098803 A1 | 5/2003 | Gourgey et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |

(56) References Cited

U.S. PATENT DOCUMENTS

| | | | |
|---|---|---|---|
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0005247 A1* | 1/2005 | Kamachi | G06F 3/011 715/804 |
| 2005/0050555 A1 | 3/2005 | Exley et al. | |
| 2005/0091098 A1 | 4/2005 | Brodersen et al. | |
| 2005/0195221 A1* | 9/2005 | Berger | G06F 3/0481 345/660 |
| 2006/0013473 A1 | 1/2006 | Woodfill et al. | |
| 2007/0157089 A1* | 7/2007 | Van Os | G06F 3/04817 715/702 |
| 2008/0072154 A1 | 3/2008 | Michaelis et al. | |
| 2008/0238727 A1* | 10/2008 | Motoe | G06F 3/0219 341/23 |
| 2008/0249972 A1 | 10/2008 | Dillon | |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2009/0240935 A1* | 9/2009 | Shukla | G06F 9/44505 713/100 |
| 2010/0011310 A1* | 1/2010 | Rainisto | G06F 3/0482 715/769 |
| 2010/0083154 A1* | 4/2010 | Takeshita | G06F 3/0486 715/769 |
| 2010/0321410 A1 | 12/2010 | Jenks et al. | |
| 2011/0016406 A1* | 1/2011 | Grosz | G06F 17/3028 715/741 |
| 2011/0218958 A1 | 9/2011 | Warshavsky et al. | |
| 2011/0247051 A1 | 10/2011 | Bulumulla et al. | |
| 2012/0042218 A1 | 2/2012 | Cinarkaya et al. | |
| 2012/0233137 A1 | 9/2012 | Jakobson et al. | |
| 2012/0278714 A1 | 11/2012 | Bradley et al. | |
| 2012/0290407 A1 | 11/2012 | Hubbard et al. | |
| 2013/0024795 A1* | 1/2013 | Robotham | G06F 3/0486 715/769 |
| 2013/0073998 A1* | 3/2013 | Migos | G06F 17/212 715/776 |
| 2013/0104029 A1* | 4/2013 | Hendry | G06F 17/2247 715/234 |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1* | 9/2013 | Cinarkaya | H04L 67/02 726/27 |
| 2014/0013271 A1* | 1/2014 | Moore | G06F 3/0482 715/792 |
| 2014/0068504 A1* | 3/2014 | Sun | G06F 3/0481 715/794 |
| 2014/0075335 A1* | 3/2014 | Hicks | G06Q 10/10 715/753 |
| 2014/0092032 A1 | 4/2014 | Moore | |
| 2014/0309872 A1* | 10/2014 | Ricci | H04W 4/21 701/36 |
| 2014/0325353 A1* | 10/2014 | Chudge | G06F 3/167 715/716 |
| 2014/0325407 A1* | 10/2014 | Morris | G06F 3/04842 715/765 |
| 2014/0359537 A1* | 12/2014 | Jackobson | G06Q 30/0261 715/855 |
| 2015/0006289 A1 | 1/2015 | Jakobson et al. | |
| 2015/0007050 A1 | 1/2015 | Jakobson et al. | |
| 2015/0095162 A1 | 4/2015 | Jakobson et al. | |
| 2015/0128031 A1* | 5/2015 | Lee | G06F 16/9577 715/238 |
| 2015/0142596 A1 | 5/2015 | Jakobson et al. | |
| 2015/0172563 A1 | 6/2015 | Jakobson et al. | |
| 2015/0188998 A1* | 7/2015 | Yuan | H04L 65/60 709/203 |
| 2015/0215245 A1 | 7/2015 | Carlson et al. | |
| 2015/0227702 A1* | 8/2015 | Krishna | G06F 19/345 705/2 |
| 2015/0331528 A1 | 11/2015 | Robinson | |
| 2016/0269671 A1* | 9/2016 | Choi | H04N 5/45 |
| 2017/0076252 A1 | 3/2017 | Hausler et al. | |
| 2018/0088762 A1 | 3/2018 | Hausler et al. | |

OTHER PUBLICATIONS

U.S. Appl. No. 15/059,174, filed Mar. 2, 2016, Hausler et al.
U.S. Appl. No. 15/085,515, filed Mar. 30, 2016, Hausler et al.
"Google Plus Users", Google+Ripples, Oct. 31, 2011 [retrieved on Feb. 21, 2012 from Internet at http://www.googleplusers.com/google-ripples.html], 3 pages.
U.S. Office Action dated Oct. 19, 2018 issued in U.S. Appl. No. 15/279,235.
U.S. Final Office Action dated May 2, 2019 issued in U.S. Appl. No. 15/279,235.
U.S. Advisory Action dated Jul. 29, 2019 issued in U.S. Appl. No. 15/279,235.
U.S. Notice of Allowance dated Sep. 10, 2019 issued in U.S. Appl. No. 15/279,235.
Shortcut Keys: Moving and Resizing Object by Lieve Weymeis published on Captivate Blog Oct. 20, 2010 (Year: 2010).

* cited by examiner

US 10,572,031 B2

PROCESSING KEYBOARD INPUT TO CAUSE RE-SIZING OF ITEMS IN A USER INTERFACE OF A WEB BROWSER-BASED APPLICATION

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to causing re-sizing of items in a user interface. More specifically, this patent document discloses techniques for processing keyboard input to cause re-sizing of items in a user interface of a web browser-based application.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

BRIEF DESCRIPTION OF THE DRAWINGS

The included drawings are for illustrative purposes and serve only to provide examples of possible structures and operations for the disclosed inventive systems, apparatus, methods and computer program products. These drawings in no way limit any changes in form and detail that may be made by one skilled in the art without departing from the spirit and scope of the disclosed implementations.

DETAILED DESCRIPTION

Figure 1:
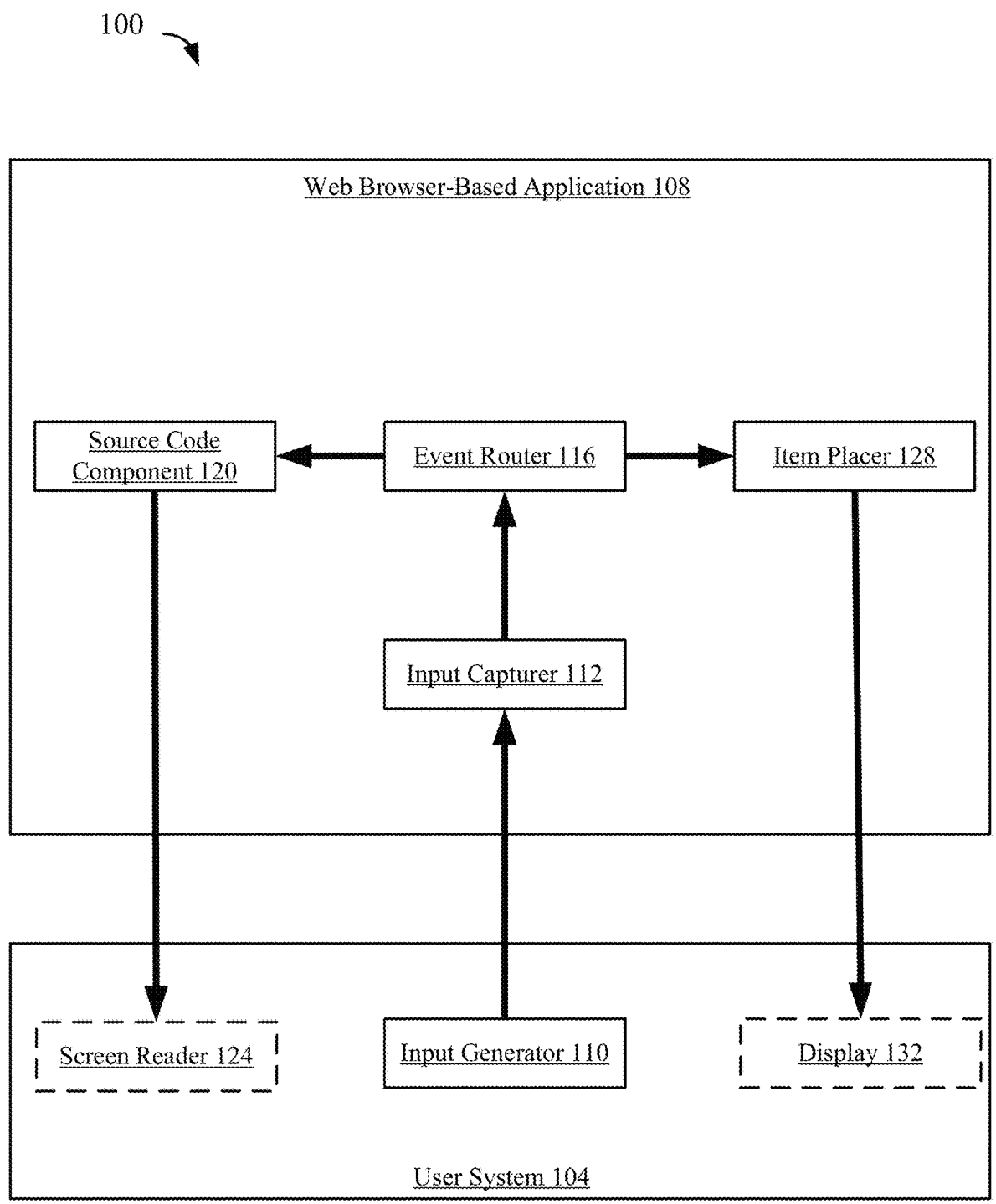
FIG. 1 shows a simplified block diagram of an example of a system 100 for processing keyboard input to cause re-sizing of items in a user interface of a web browser-based application, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Some implementations of the disclosed systems, apparatus, methods and computer program products are configured for processing keyboard input, such as key strokes on a keyboard of a computing device, to cause re-sizing of items in a user interface of a web browser-based application. The items discussed herein encompass a range of subject matter. For example, as described in further detail below, such items may include any object capable of being visually represented in a user interface, such as a chart, a list, a button, a calendar event, etc. Such items may include visual representations of data objects stored in a database that may be accessed and utilized in conjunction with any computing application such as, but not limited to, a cloud-based enterprise application.

Conventional web browser-based applications can be inaccessible to users with disabilities such as users who are visually impaired or unable to use a mouse. By way of illustration, items displayed in user interfaces of most conventional web browser-based applications can only be resized using a mouse.

Some of the disclosed techniques can be used to make web browser-based applications more accessible to users with disabilities. For example, in some implementations, a user may be able to resize items in a user interface of a web browser-based application simply by using his or her keyboard. By way of example, Rochester is a software developer at Eyre books, an online book retailer that provides braille books to blind customers. Jane, the Chief Executive Officer (CEO) of Eyre Books, has assigned Rochester the task of designing the page layout of Eyre Books' new "Best Seller Lists" page. However, because Rochester is blind, he cannot design the page layout for the Best Seller Lists page using a mouse. In some implementations, Rochester can open his web browser-based graphical editor in a web browser window. As described below, he can resize items in the user interface of his web browser-based graphical editor merely by entering input into the braille keyboard of his computing device. By way of illustration, Rochester would like to increase the size of a chart that depicts the sales of novels by the Bronte sisters over the last 100 years. Rochester may navigate to the chart by pressing the tab key on his keyboard. He can press the spacebar to grab the lower right corner of the chart, press the right arrow key to expand the chart to the right, press the down arrow key to expand the chart downwards, and press the spacebar again to fix the chart at a desired size.

In some implementations, auditory output can be provided to a sight-impaired user of a web browser-based application to improve his or her experience. For instance, returning to the example of the preceding paragraph, as Rochester re-sizes items, his computing device can play auditory output describing a narration of Rochester's actions and instructions on how he may proceed. By way of example, when Rochester presses the spacebar to grab the lower right corner of the chart, his computing device may transmit the auditory output: "Lower right corner of the Bronte sisters' sales chart has been grabbed. Use the arrow keys to re-size the chart." As described below, the auditory output may be retrieved by a screen reader on Rochester's computing device from a visually hidden, dynamically updated, source code element, such as a HyperText Markup Language (HTML) <div>.

FIG. 1 shows a simplified block diagram of an example of a system 100 for processing keyboard input to cause re-sizing of items in a user interface of a web browser-based application, in accordance with some implementations. In FIG. 1, a user system 104, such as a laptop computer, a desktop computer, a smart phone, a tablet, a wearable device, etc., interacts with a web browser-based application 108 such as the Salesforce Lightning Platform®. The web browser-based application 108 may be implemented using a server system and database system such as database system 16 of FIGS. 5A and 5B.

The user system 104 may include an input generator 110. The input generator 110 may be any device capable of receiving input from a user of the user system 104. By way of example, the input generator 110 may be a keyboard capable of receiving keyboard input, a microphone capable of receiving voice input, a switch, such as an eyebrow or cheek switch, capable of receiving switch input, a camera capable of receiving motion or gesture input, etc. An input capturer 112 may receive and process input transmitted by the input generator 110. When the input capturer 112 receives particular input from the input generator 110, the input capturer 112 may send data indicating an event corresponding to the particular input to an event router 116. By way of illustration, if the input generator 110 is a keyboard, the input capturer 112 may process keyboard input from the keyboard and send data indicating an event that corresponds to the processed keyboard input to the event router 116. By way of example, Rochester is operating the user system 104. Rochester is interacting with the Salesforce Lightning Platform® to re-size item B in the user interface. Rochester presses the spacebar on his keyboard "grab" the right edge of item B, a rectangular item. As used herein, the action of "grabbing" a particular edge or corner of an item generally refers to the transformation of the particular edge or corner into a re-configurable state such that the particular edge or corner may be moved relative to other items in the user interface, thereby causing the item to be resized. When Rochester presses the spacebar, his keyboard, which functions as input generator 110 of FIG. 1, sends data to the input capturer 112. The input capturer 112 processes the data to determine that Rochester has pressed the spacebar when interacting with the right edge of item B, which corresponds to the event of the right edge of item B being transformed to a re-configurable state. The input capturer 112 sends data to the event router 116 indicating the occurrence of the event that the right edge of item B has been transformed to the re-configurable state.

In some implementations, the input capturer 112 may send data to the event router 116 indicating the occurrence of events corresponding to other kinds of input such as voice input, switch input, motion input, or gesture input described above. By way of example, if the input generator 110 is a microphone, the input capturer 112 may process voice data received from the input generator 110. For instance, if the voice data contains the words "re-size item B" or "grab the right edge of item B," the input capturer 112 may send data to the event router 116 indicating the occurrence of the event that the right edge of item B has been transformed to a re-configurable state.

The event router 116 may relay data to a source code component 120 of a web page of the web browser-based application 108. As described below, the source code component 120 may be a segment of source code that includes content that is capable of being automatically updated in response to receiving data indicating the occurrence of an event from the event router 116. Each time content of the source code component 120 is updated, the source code component 120 can make the updated content available to a screen reader 124 of the user device 104. The screen reader 124 may process the data causing auditory output to be played by the user device 104. By way of illustration, returning to the example of the preceding paragraph, the source code component 120 may be updated in response to the occurrence of the event of the right edge of item B being transformed to a re-configurable state to include the string "the right edge of item B has been grabbed, use arrow keys to move the right edge of item B." The screen reader 124 can access the string causing an auditory representation of the string to be played by the user device 104.

In some implementations, the source code component 120 may be a HyperText Markup Language (HTML) <div> that contains information which is accessible to a screen reader but that is not displayed when the user system 104 renders web pages of the web browser-based application. By way of example, the source code component 120 may be an "aria-live" <div> that includes aria attributes, which are a set of attributes allowing communication with assistive technology such as a screen reader. By way of example, the Source code component 120 may be defined using the following HTML code:

<div aria-live="assertive">

The "live" property in the above HTML code indicates that the <div> will be updated, allowing the content of the <div> to include an updated string whenever the event router 116 relays data indicating occurrence of an event such as an edge or corner of an item being transformed to a re-configurable state. The string may be placed at the top of the queue of the screen reader 124 each time the string is updated such that each time a user of the user system 104 interacts with an item, s/he may hear an auditory representation of a string describing his/her interaction and/or providing him/her with instructions on how to perform further interactions. By way of illustration, returning to the above example, when Rochester grabs the right edge of item B using the keyboard of his computing device, he may hear an auditory representation of the string "the right edge of item B has been grabbed, use arrow keys to move the right edge of item B."

Also or alternatively, each time the event router 116 receives data from the input capturer 112, the event router 116 may relay data to item placer 128. The item placer 128 may record, store, and/or update the placement of items in the user interface of the web browser-based application 108. By way of example, the item placer 128 may use a Cartesian coordinate system to store locations of items, e.g. items may be placed in cells of a rectangular grid of any size such as a 10×10 grid, a 2×30 grid, a 42×1 grid, etc. Alternatively, the item placer 128 may use any other coordinate system of arbitrary dimensions such as a two dimensional polar coordinate system, a three dimensional spherical or cylindrical coordinate system, etc. The item placer 128 may receive data from event router 116 indicating changes of sizes of items. By way of illustration, the input capturer 112 processes input from Rochester's keyboard that a right arrow key has been pressed; the item placer 128 may then receive data from the event router 116 indicating occurrence of an event that the right edge of item B has been moved one cell to the right, increasing the width of item B by 1 cell on its right side.

In some implementations, the user system 104 may include a display 132, in which case, the item placer 128 may send data to the user system 104, causing a presentation of the current placement and sizing of items to be rendered on the display 132.

Figure 2:
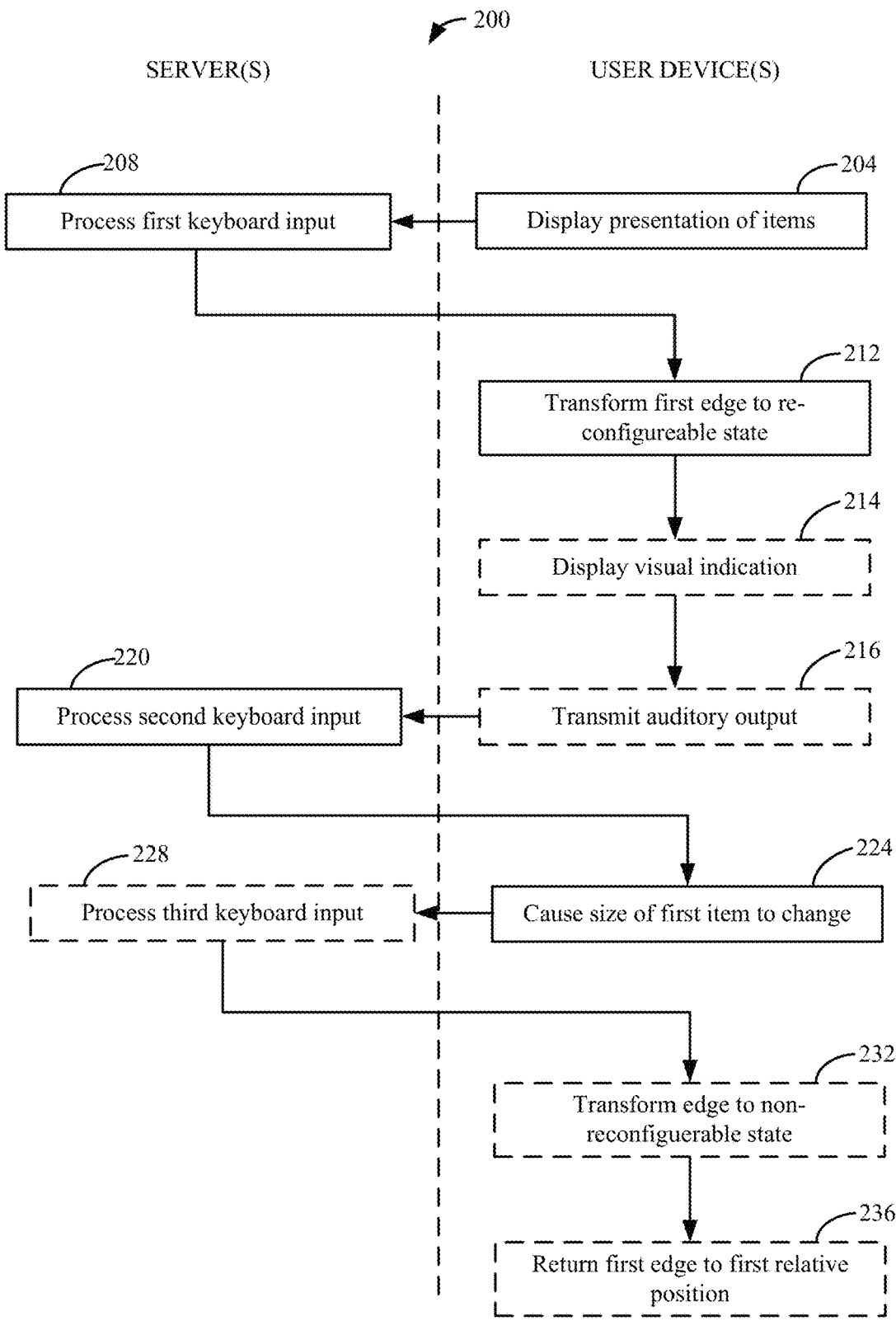
FIG. 2 shows a flowchart of an example of a method 200 for processing keyboard input to cause re-sizing of items in a user interface of a web browser-based application, in accordance with some implementations.
Figure 3A:
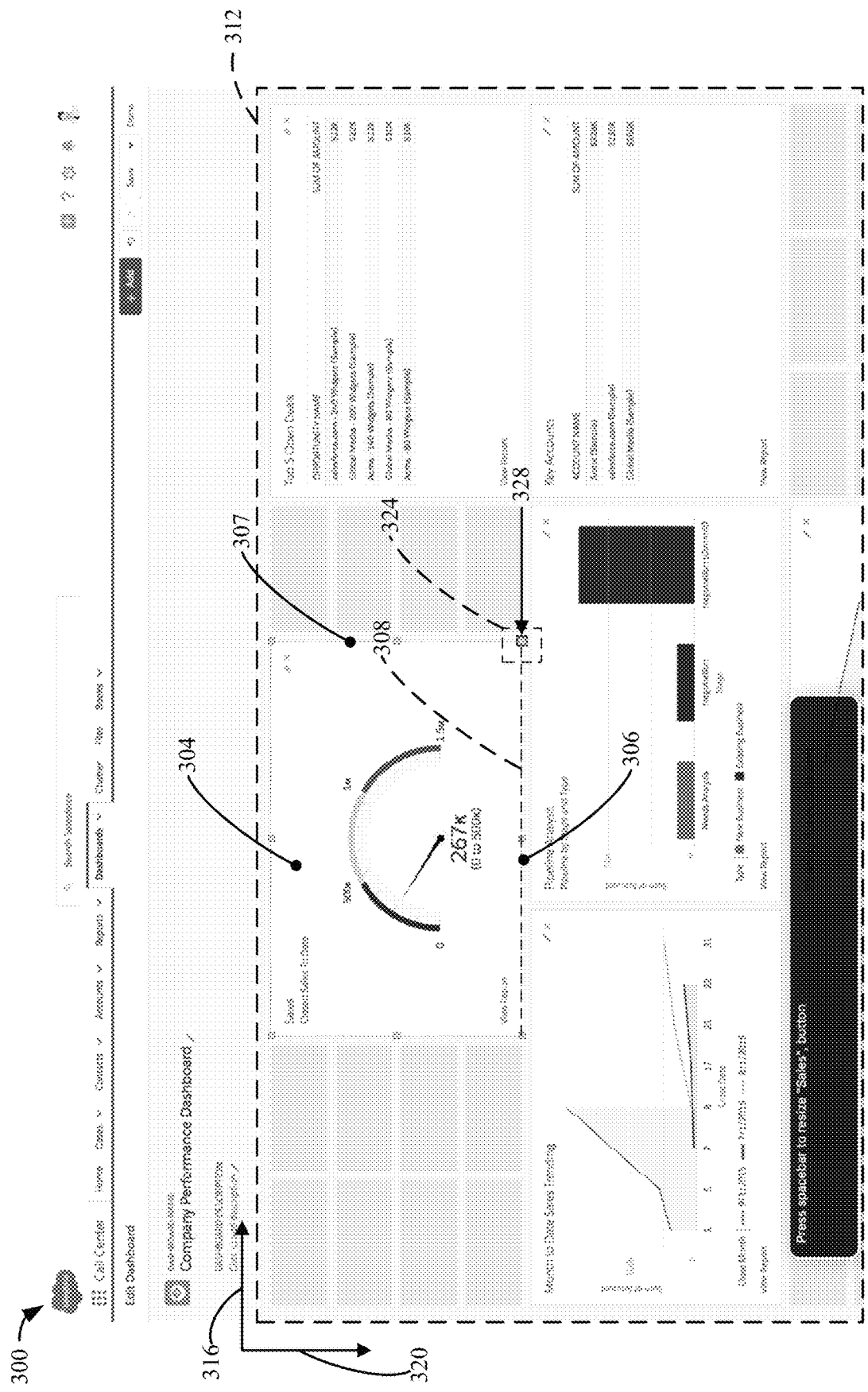
FIG. 3A shows an example of a presentation of items in the form of a graphical user interface (GUI) as displayed on a computing device, in accordance with some implementations.
Figure 3B:
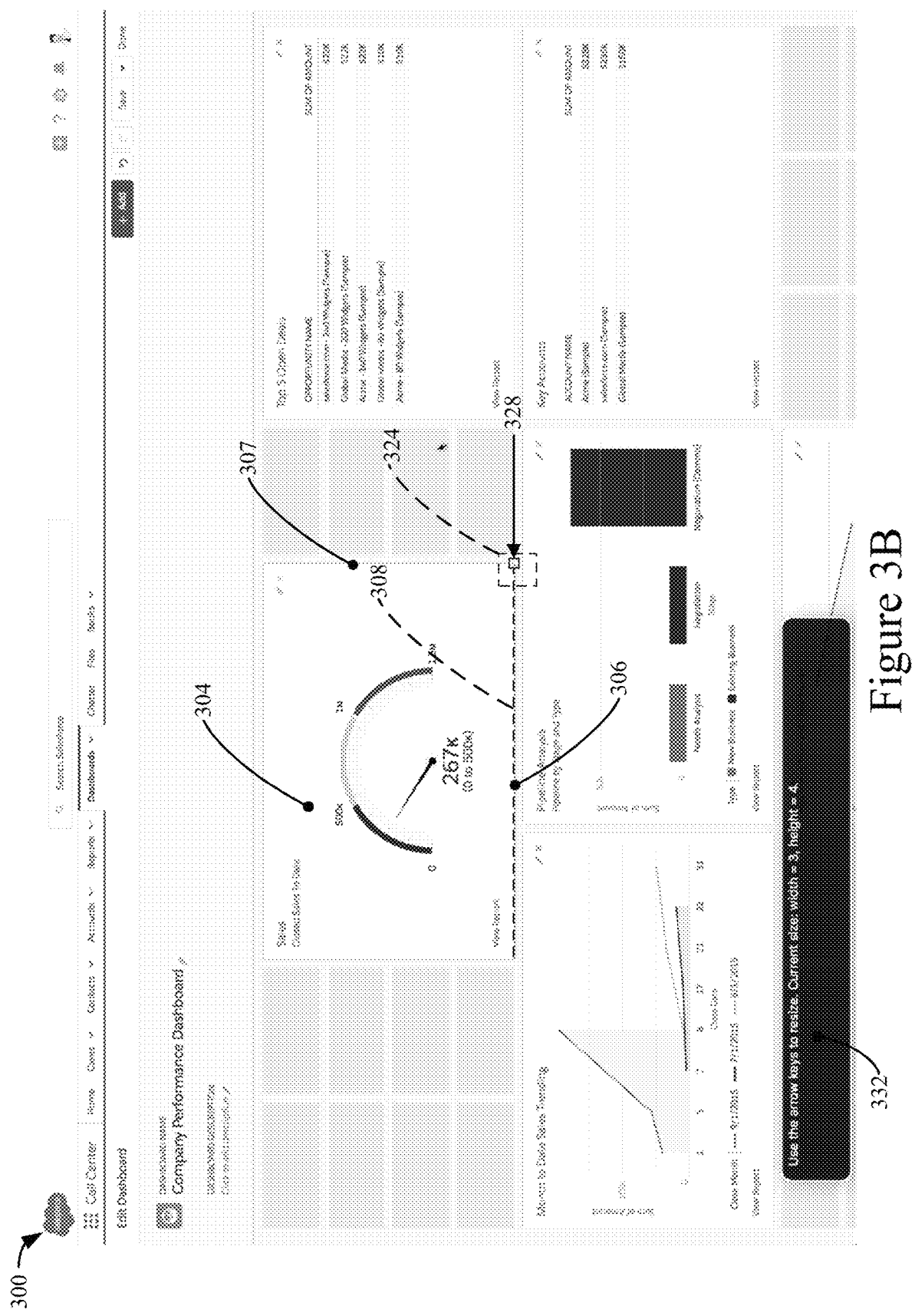
FIG. 3B shows another example of a presentation of items in the form of a GUI as displayed on a computing device, in accordance with some implementations.
Figure 4:
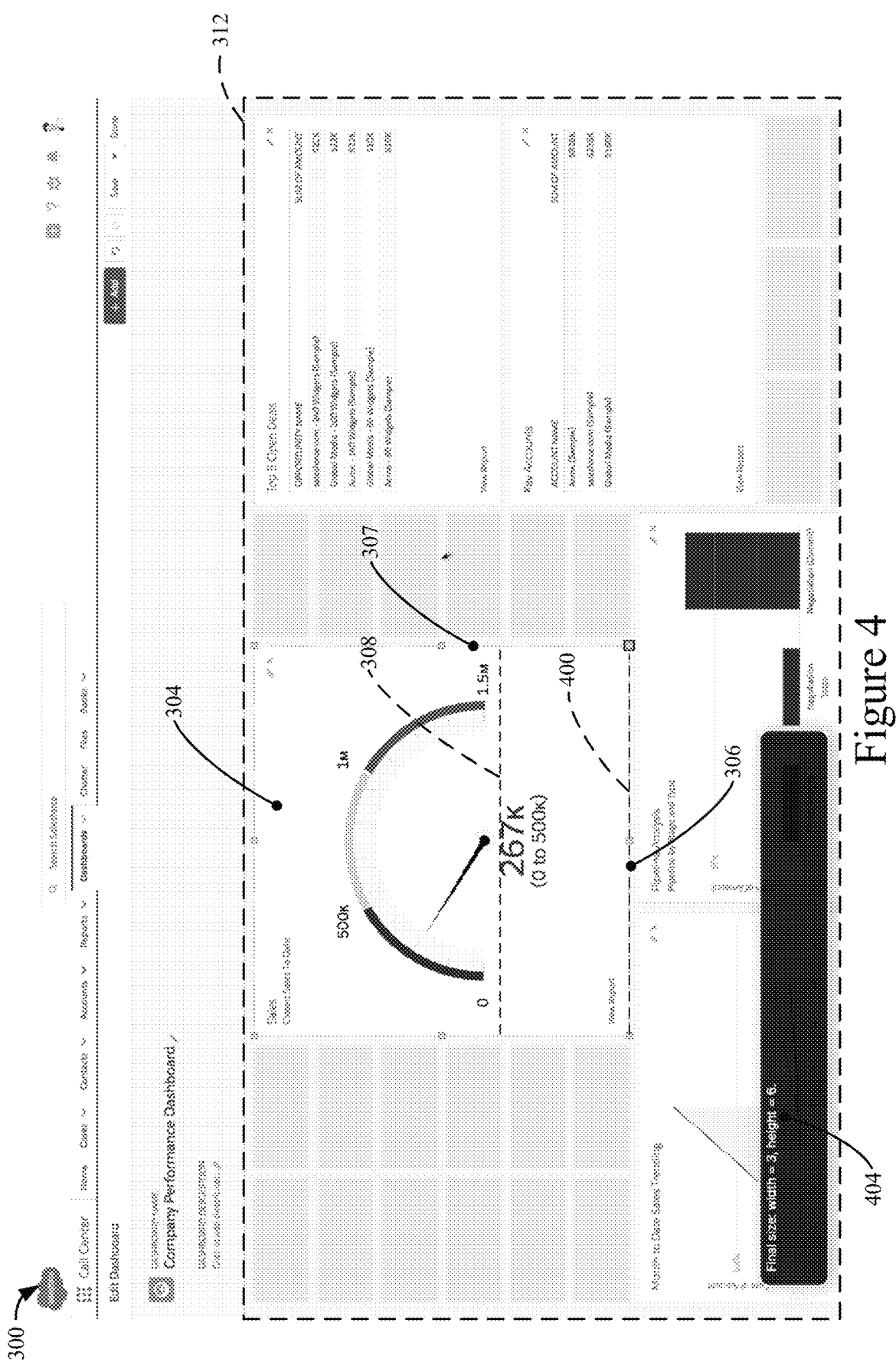
FIG. 4 shows another example of a presentation of items in the form of a GUI as displayed on a computing device, in accordance with some implementations.

FIG. 2 shows a flowchart of an example of a method 200 for processing keyboard input to cause re-sizing of items in a user interface of a web browser-based application, in accordance with some implementations. FIG. 2 is described with reference to FIGS. 3A-4. FIG. 3A shows an example of a presentation of items in the form of a graphical user interface (GUI) as displayed on a computing device, in accordance with some implementations. FIG. 3B shows another example of a presentation of items in the form of a GUI as displayed on a computing device, in accordance with some implementations. FIG. 4 shows another example of a presentation of items in the form of a GUI as displayed on a computing device, in accordance with some implementations.

At 204 of FIG. 2, bounding window 300 of FIG. 3A of a web browser is displayed in a user interface on a display of a computing device such as the display 132 of the user system 104 of FIG. 1. Bounding window 300 of FIG. 3A includes a presentation of items, e.g. chart 304, which is visual representation of a sales report generated based on sales data stored in a database of a database system. Such items may vary across implementations, e.g. as described above, such items may be any object capable of being visually represented in a user interface. By way of example, chart 304 is a visual representation of Customer Relationship Management (CRM) records stored in a database. Types of such CRM records may include accounts, tasks, leads, contacts, contracts, opportunities, etc.

The shapes of items, such as chart 304, may vary across implementations. For example, while the items depicted in FIG. 3A have a rectangular shape, items may have any shape including but not limited to, a polygonal shape, a round shape, an ovular shape, an elliptical shape, an obround shape, etc. Along these lines, items may be any shape that is bounded by at least one edge. By way of example, chart 304 is bounded by 4 edges including bottom edge 306 and right edge 307.

Bottom edge 306 of chart 304 is displayed at relative position 308 with respect to other items in the user interface, which is situated in region 312 of the user interface. Region 312 includes permissible locations at which chart 304 is permitted to be displayed. By way of example, as described further below, Rochester may re-size chart 304 such that the edges of chart 304 are situated anywhere on a Cartesian grid in region 312. In some implementations, such a Cartesian grid may have an origin in the upper left corner of region 312 such that values of coordinates along an x-axis 316 increase from left to right and values of coordinates along y-axis 320 increase from top to bottom such that navigation of the grid moves from left to right and top to bottom similar to the logical flow of English text.

At 208 of FIG. 2, first keyboard input from a user interacting with chart 304 of FIG. 3A is processed. Such keyboard input can be received over a data network such as the internet from a computing device such as a laptop or desktop computer. Such keyboard input can include the pressing or holding of any key or combination of keys on the keyboard of a computing device.

By way of illustration, as described above, Rochester may be operating the user system 104 of FIG. 1. Rochester is interacting with the Salesforce Lightning Platform® to move a particular edge of chart 304 of FIG. 3A, e.g., bottom edge 306. Rochester presses the spacebar on his keyboard to grab lower-right corner 324. When Rochester presses the spacebar, his keyboard, which functions as input generator 110 of FIG. 1, sends data to the input capturer 112. The input capturer 112 processes Rochester's keyboard input and sends data indicating an event that corresponds to the processed keyboard input to the event router 116.

Keyboard inputs and interactions with items can vary across implementations. By way of illustration, prior to grabbing lower-right corner 324 of FIG. 3A, Rochester might wish to navigate between items to select chart 304, in which case he can use the tab key on the keyboard of his computing device to move forward along the Cartesian grid and the shift-tab keystroke to move backwards. Once Rochester navigates to chart 304, he may press the tab key on his keyboard to navigate between handles on edges and corners of chart 304 to handle 328 on the lower-right corner 324 of chart 304.

In some implementations, the lower right corner may be the default location of an item that is grabbed, when a user presses the spacebar on the keyboard of his or her computing device. Once a user grabs the lower right corner of an item the user may expand or contract the width of the item by pressing the right and left arrow keys of his/her keyboard respectively. Similarly, the user may expand or contract the height of the item by pressing the down and up arrow keys of his/her keyboard respectively.

In some implementations, using the techniques described above, other kinds of input such as voice input, switch input, motion input, or gesture input, etc. may be processed at 208 of FIG. 2 in lieu of keyboard input.

At 212 of FIG. 1, bottom edge 306 FIG. 3A and right edge 307 are transformed to a re-configurable state such that bottom edge 306 and right edge 307 and may be moved in the user interface. As described above, such transformation of an edge or corner of an item to a re-configurable state is also referred to herein as "grabbing" the edge or corner of the item. Since the lower-right corner 324 coincides with both bottom edge 306 and right edge 307, grabbing lower right corner causes both bottom edge 306 and right edge 307 to be transformed to a re-configurable state.

Bottom edge 306 and right edge 307 may be transformed to the movable state in response the first keyboard input being processed at 208 of FIG. 2. By way of illustration, returning to the example described above, the input capturer 112 of FIG. 1 may process data to determine that Rochester has pressed the spacebar when handle 328 of FIG. 3A is selected, which corresponds to the event of the lower-right corner 324 of chart 304 being grabbed because handle 328 is located at lower-right corner 324. The input capturer 112 sends data to the event router 116 indicating the occurrence of the event that lower-right corner 324 has been grabbed. The event router 116 may then relay data to the item placer 128 and the item placer 128 may be updated based on the data to allow the location of bottom edge 306 and right edge 307 to be changed in the user interface.

In some, but not all, implementations, at 214 of FIG. 2, a visual indication may be displayed in association with handle 328 of FIG. 3B. The visual indication may indicate that any edges coinciding with the handle 328, e.g., bottom edge 306 and right edge 307, are in a re-configurable state. By way of example, in FIG. 3B, it is visually indicated that handle 328 has been grabbed, because other handles on other edges of chart 304 are not displayed. Also or alternatively, when an edge or corner of an item is grabbed, other visual indications of the edge or corner of an item being in a re-configurable state may be displayed in the user interface. By way of example, when an edge or corner is grabbed, the edge or corner may be surrounded by a border, may change color or become brighter or darker.

In some, but not all, implementations, at 216 of FIG. 2, auditory output 332 of FIG. 3B is transmitted by a computing device, e.g. the user system 104 of FIG. 1. The auditory output 332 may include a variety of information. By way of example, the auditory output 332 may instruct a user, such as Rochester, to enter additional keyboard input in order to re-size chart 304. For instance, the auditory output 332 states "[u]se the arrow keys to resize." The auditory output 332 also includes the current dimensions of the chart 304 in the form of a width along the x-axis 316 and a height along the y-axis 320.

In some implementations, the auditory output 332 may be played in response to processing the first keyboard input at 208 of FIG. 2. By way of illustration, the input capturer 112 of FIG. 1 may process data to determine that Rochester has pressed the spacebar when interacting with lower-right corner 324 of chart 304 of FIG. 3A, which corresponds to the event of lower-right corner 324 of chart 304 being grabbed. The input capturer 112 may then send data to the event router 116 indicating the occurrence of the event that the lower-right corner 324 of chart 304 has been grabbed. The event router 116 may then relay data to the source code component 120 and the source code component 120 may be updated to include the auditory output 332 of FIG. 3B. For example, as described above, the source code component 120 of FIG. 1 may be an aria-live <div>. The content of the aria-live <div> may be updated in response to the occurrence of the event of the lower-right corner 324 of chart 304 being grabbed to include the string "Use the arrow keys to resize. Current size: width=3, height=4." The screen reader 124 of FIG. 1 can access the string causing the auditory output 332 of FIG. 3B to be played by the user device 104 of FIG. 1.

At 220 of FIG. 2, second keyboard input from a user interacting with chart 304 of FIG. 3A is processed. Such keyboard input can be received over a data network such as the internet from a computing device such as a laptop or desktop computer. Such keyboard input can include the pressing or holding of any key or combination of keys on the keyboard of a computing device.

In some implementations, the second keyboard input may be the pressing of an arrow key of the keyboard of the device. By way of illustration, as described above, Rochester may be operating the user system 104 of FIG. 1. Rochester is interacting with the Salesforce Lightning Platform® to re-size chart 304 of FIG. 3A. The second keyboard input processed at 220 of FIG. 2 may reflect Rochester pressing the down arrow key on his keyboard to move the bottom edge 306 of chart 304 downwards in the user interface. When Rochester presses the down arrow key of his keyboard, which may function as input generator 110 of FIG. 1, data may be sent to the input capturer 112. The input capturer 112 processes Rochester's keyboard input and sends data indicating an event that corresponds to the processed keyboard input to the event router 116.

Also or alternatively, using the techniques described above, other kinds of input such as voice input, switch input, motion input, or gesture input, etc. may be processed at 220 of FIG. 2 in lieu of keyboard input.

At 224 of FIG. 2, the size of chart 304 of FIG. 3B is caused to change by causing the bottom edge 306 to move from relative position 308 of FIG. 3B to relative position 400 of FIG. 4 with respect to the other items displayed in the user interface. As depicted in FIG. 4, relative position 400 is different from relative position 308; however, the relative position 400 is situated in the region 312 of the user interface. As described above, region 312 includes permitted locations at which edges of chart 304 are permitted to be placed.

The size of chart 304 of FIG. 3B may be caused to change in response to the second keyboard input being processed at 220 of FIG. 2. By way of illustration, returning to the above example, the input capturer 112 of FIG. 1 may send data to the event router 116 indicating the occurrence of the event that the down arrow key on Rochester's keyboard has been pressed. The event router 116 may then relay data to the item placer 128 and the item placer 128 may be updated based on the data to change the location of the bottom edge 306 of chart 304 from relative position 308 of FIG. 3B to relative position 400 of FIG. 4.

Also or alternatively, when chart 304 of FIG. 3B is caused to change locations from relative position 308 to relative position 400 of FIG. 4, auditory output 404 may be played by the device. By way of example, the input capturer 112 of FIG. 1 may process data to determine that Rochester has pressed the down arrow key, which corresponds to the event of the bottom edge 306 of chart 304 being moved downwards. The input capturer 112 may then send data to the event router 116 indicating the occurrence of the event that the bottom edge 306 of chart 304 has been moved downwards. The event router 116 may then relay data to the source code component 120 and the source code component 120 may be updated to include the auditory output 404 of FIG. 4, causing Rochester's computing device to play the auditory output 404, as described above.

In some implementations, 220 and 224 of FIG. 2 may be repeated such that an item may be re-sized to a desired size. By way of example, Rochester may wish to resize an item by moving the right edge of the item two cells to the right and the bottom edge of the item one cell downwards in a Cartesian grid. In this case, Rochester may grab the lower right corner of the item using the techniques described above. Rochester may then press the right arrow key twice. Each time Rochester presses the right arrow key, the right edge of the item is caused to move one cell to the right. Rochester may then press the down arrow key once, causing the bottom edge of the item to move one cell downwards.

In some implementations, the first keyboard input processed at 208 of FIG. 2 may be the same keyboard input as the second keyboard input processed at 220 of FIG. 2. By way of example, Rochester may enter the keystroke ctrl-page down on the keyboard of his computing device to grab the bottom edge of an item and move the bottom edge of the item to the bottom of the region 312 of FIG. 3A.

In some, but not all, implementations, at 228 of FIG. 2, third keyboard input from a user interacting with chart 304 of FIG. 3B is processed. Such keyboard input can be received over a data network such as the internet from a computing device such as a laptop or desktop computer. Such keyboard input can include the pressing or holding of any key or combination of keys on the keyboard of a computing device.

Also or alternatively, using the techniques described above, other kinds of input such as voice input, switch input, motion input, or gesture input, etc. may be processed at 228 of FIG. 2 in lieu of keyboard input.

In some implementations, the third keyboard input processed at 228 may reflect the dropping of the bottom edge 306 of chart 304 of FIG. 4 at relative position 400, e.g., causing the bottom edge 306 to become fixed at relative position 400. By way of example, Rochester may press the spacebar key on the keyboard of his computing device to drop the bottom edge 306 of chart 304. In this scenario, at 232 of FIG. 2, in response to Rochester pressing the spacebar key on the keyboard of his computing device, the bottom edge 306 of chart 304 of FIG. 4 is caused to become fixed in relative position 400. By way of illustration, the input capturer 112 of FIG. 1 may process data to determine that Rochester has pressed the spacebar when interacting with the bottom edge 306 of chart 304 of FIG. 4, which corresponds to the event of the bottom edge 306 of chart 304 being dropped. The input capturer 112 sends data to the event router 116 indicating the occurrence of the event that the bottom edge 306 of chart 304 has been dropped. The event router 116 may then relay data to the item placer 128 and the item placer 128 may be updated based on the data to transform the bottom edge 306 of chart 304 of FIG. 4 to a non-reconfigurable state.

Alternatively, in some implementations, third keyboard input processed at 228 may reflect returning of the bottom edge 306 of chart 304 of FIG. 4 to relative position 308 of FIG. 3A. By way of example, Rochester may press the escape key or ctrl-z keystroke on the keyboard of his computing device to return the bottom edge 306 of chart 304 of FIG. 4 to relative position 308 of FIG. 3A. In this scenario, at 236 of FIG. 2, in response to Rochester pressing the escape key on the keyboard of his computing device, the bottom edge 306 of chart 304 of FIG. 4 is caused to return to relative position 308 of FIG. 3A. By way of illustration, the input capturer 112 of FIG. 1 may process data to determine that Rochester has pressed the escape key when interacting with the bottom edge 306 of chart 304 of FIG. 4, which corresponds to the event of the bottom edge 306 of chart 304 being returned to its previous location prior to being grabbed. The input capturer 112 sends data to the event router 116 indicating the occurrence of the event that the bottom edge 306 of chart 304 has been returned to its previous location. The event router 116 may then relay data to the item placer 128 and the item placer 128 may be updated based on the data to cause the bottom edge 306 of chart 304 of FIG. 4 to return to relative position 308 of FIG. 3A.

One having skill in the art can appreciate that auditory output may be played by a screen reader of a computing device at any point during, before, or after performance of method 200 of FIG. 2. By way of example, before Rochester grabs the bottom edge 306 of chart 304 of FIG. 3A at 208 of FIG. 2, Rochester may navigate to the bottom edge 306 of chart 304 of FIG. 3A using the tab key of his keyboard. Each time Rochester presses the tab key on his computing device, a screen reader of his computing device may narrate Rochester's navigation. Also or alternatively, if Rochester presses the spacebar key on the keyboard of his computing device to drop the bottom edge 306 of chart 304 of FIG. 4 at 228 of FIG. 2, a screen reader of his computing device may play auditory output indicating that the bottom edge 306 of chart 304 has been dropped. Similarly, if Rochester presses the escape key on the keyboard of his computing device to return the bottom edge 306 of chart 304 of FIG. 4 to relative position 308 of FIG. 3A at 228 of FIG. 2, a screen reader of his computing device may play auditory output indicating the bottom edge 306 of chart 304 has been returned to relative position 308 of FIG. 3A. And so on and so forth.

Also or alternatively, the disclosed techniques may be implemented in conjunction with traditional mouse-based resizing models. By way of example, Jane may cause the bottom edge 306 of chart 304 of FIG. 3A to change locations from relative position 308 to relative position 400 of FIG. 4 simply by clicking the bottom edge 306 with her mouse, moving the bottom edge 306 to relative position 400 while her mouse button is depressed, and letting go of her mouse button once the bottom edge 306 reaches relative position 400.

Systems, apparatus, and methods are described below for implementing database systems and enterprise level social and business information networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

By way of example, a user can update a record in the form of a CRM object, e.g., an opportunity such as a possible sale of 1000 computers. Once the record update has been made, a feed tracked update about the record update can then automatically be provided, e.g., in a feed, to anyone subscribing to the opportunity or to the user. Thus, the user does not need to contact a manager regarding the change in the opportunity, since the feed tracked update about the update is sent via a feed to the manager's feed page or other page.

Figure 5A:
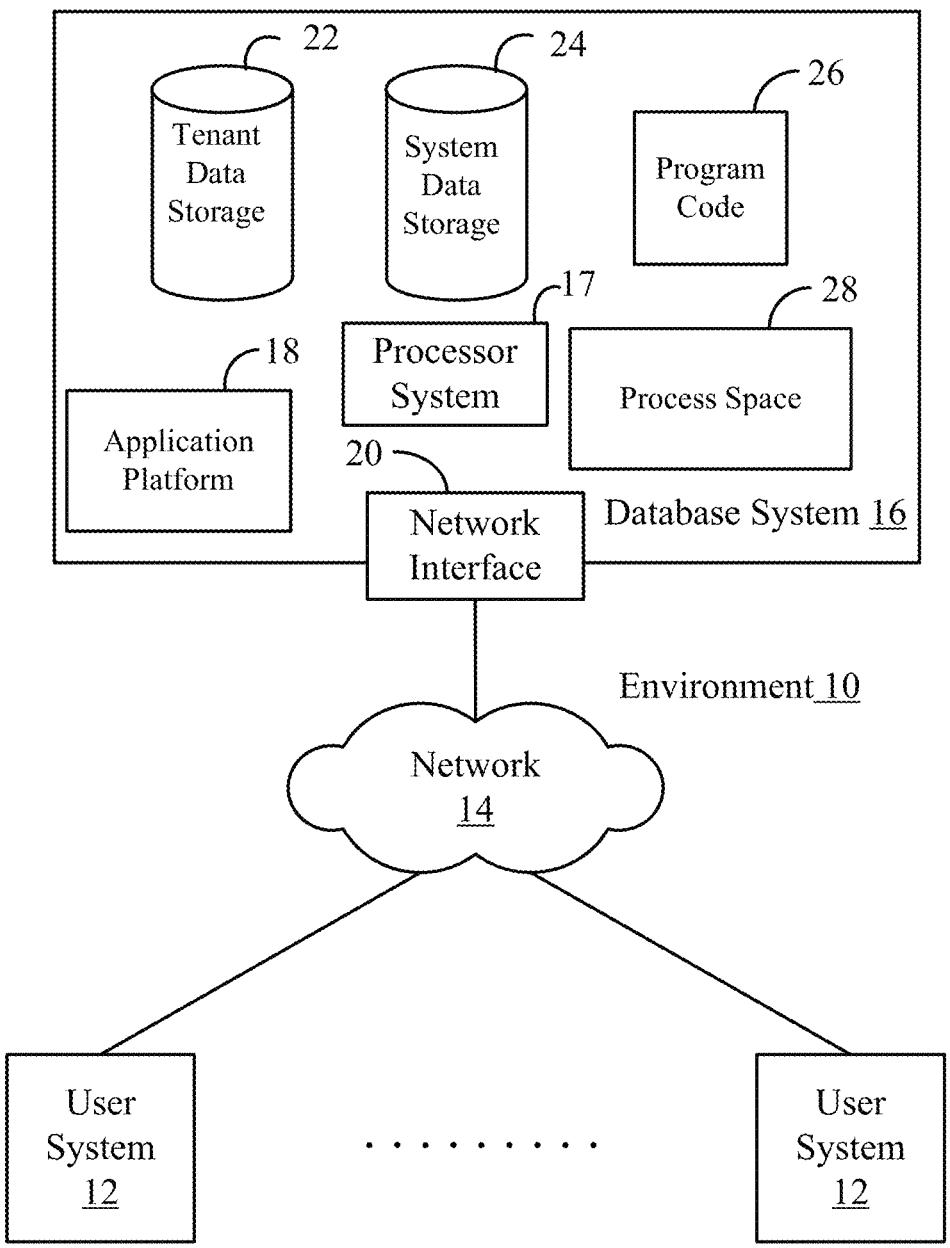
FIG. 5A shows a block diagram of an example of an environment 10 in which an on-demand database service can be used in accordance with some implementations.

FIG. 5A shows a block diagram of an example of an environment 10 in which an on-demand database service exists and can be used in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 5A (and in more detail in FIG. 5B) user systems 12 might interact via a network 14 with an on-demand database service, which is implemented in the example of FIG. 5A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 5A, implements a web browser-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 5B:
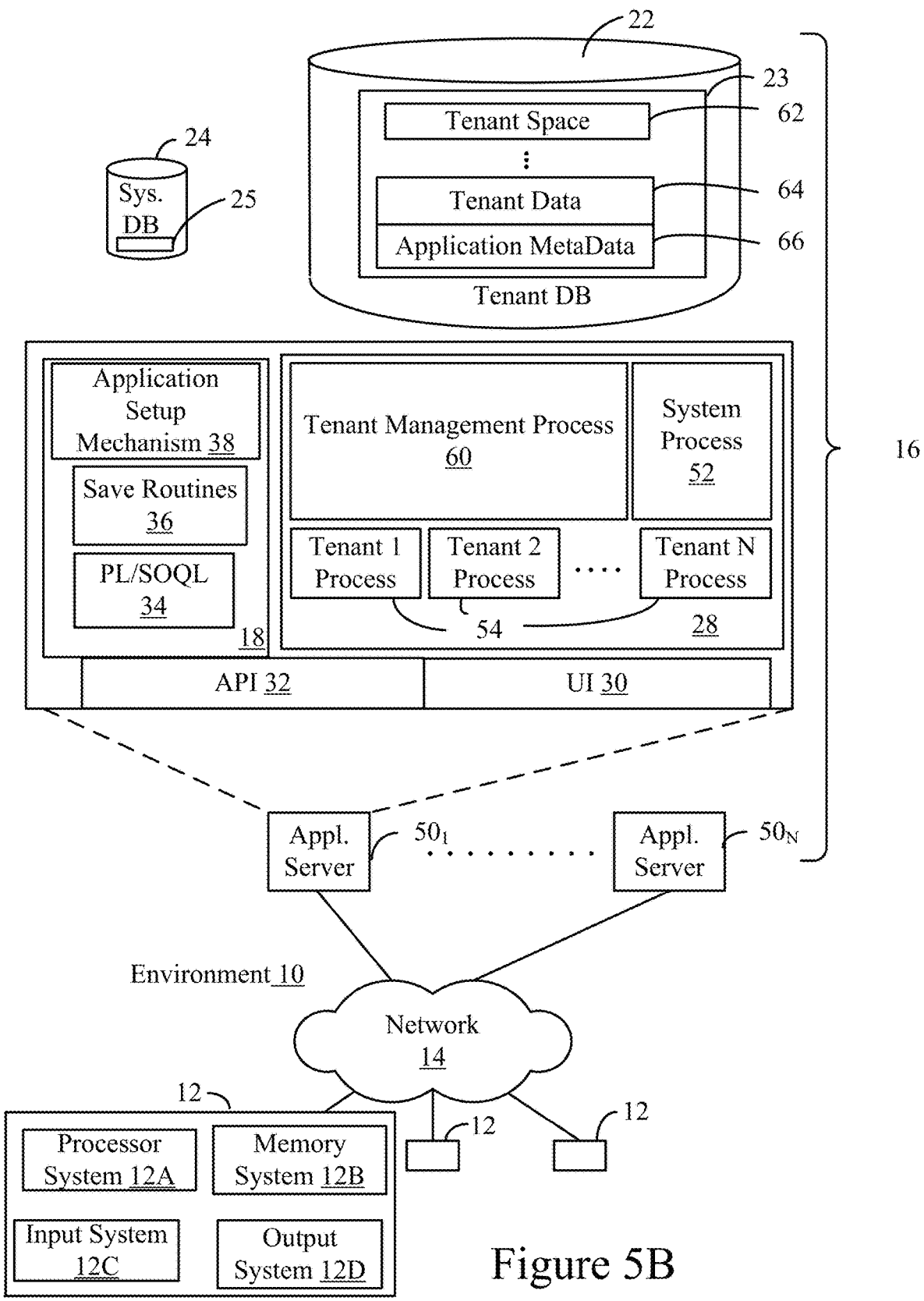
FIG. 5B shows a block diagram of an example of some implementations of elements of FIG. 5A and various possible interconnections between these elements.

One arrangement for elements of system 16 is shown in FIGS. 5A and 5B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 5A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 5B shows a block diagram of an example of some implementations of elements of FIG. 5A and various possible interconnections between these elements. That is, FIG. 5B also illustrates environment 10. However, in FIG. 5B elements of system 16 and various interconnections in some implementations are further illustrated. FIG. 5B shows that user system 12 may include processor system 12A, memory system 12B, input system 12C, and output system 12D. FIG. 5B shows network 14 and system 16. FIG. 5B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 5A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 5B, system 16 may include a network interface 20 (of FIG. 5A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 6A:
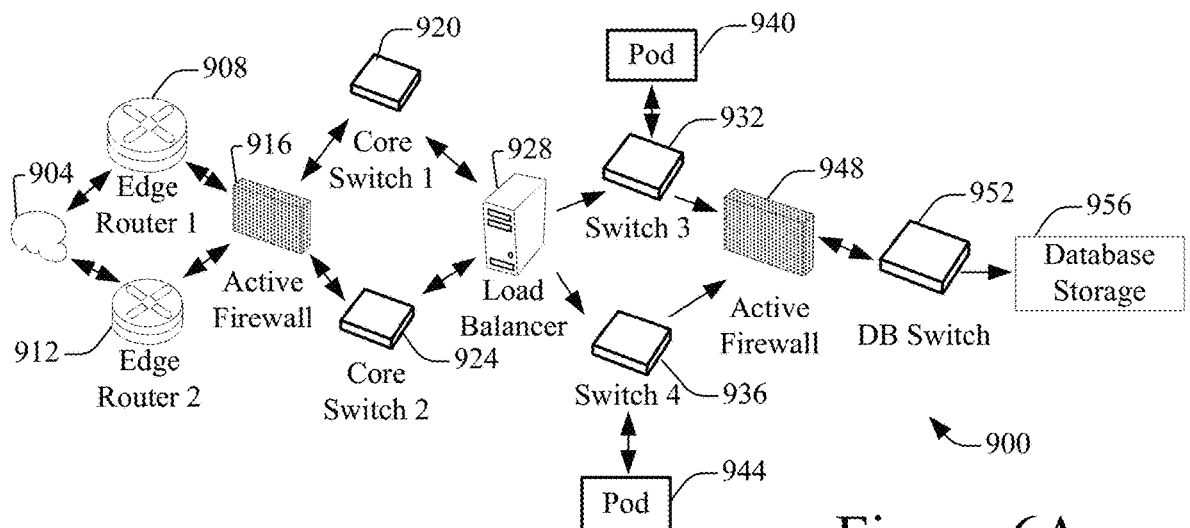
FIG. 6A shows a system diagram of an example of architectural components of an on-demand database service environment 900, in accordance with some implementations.

FIG. 6A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 6B:
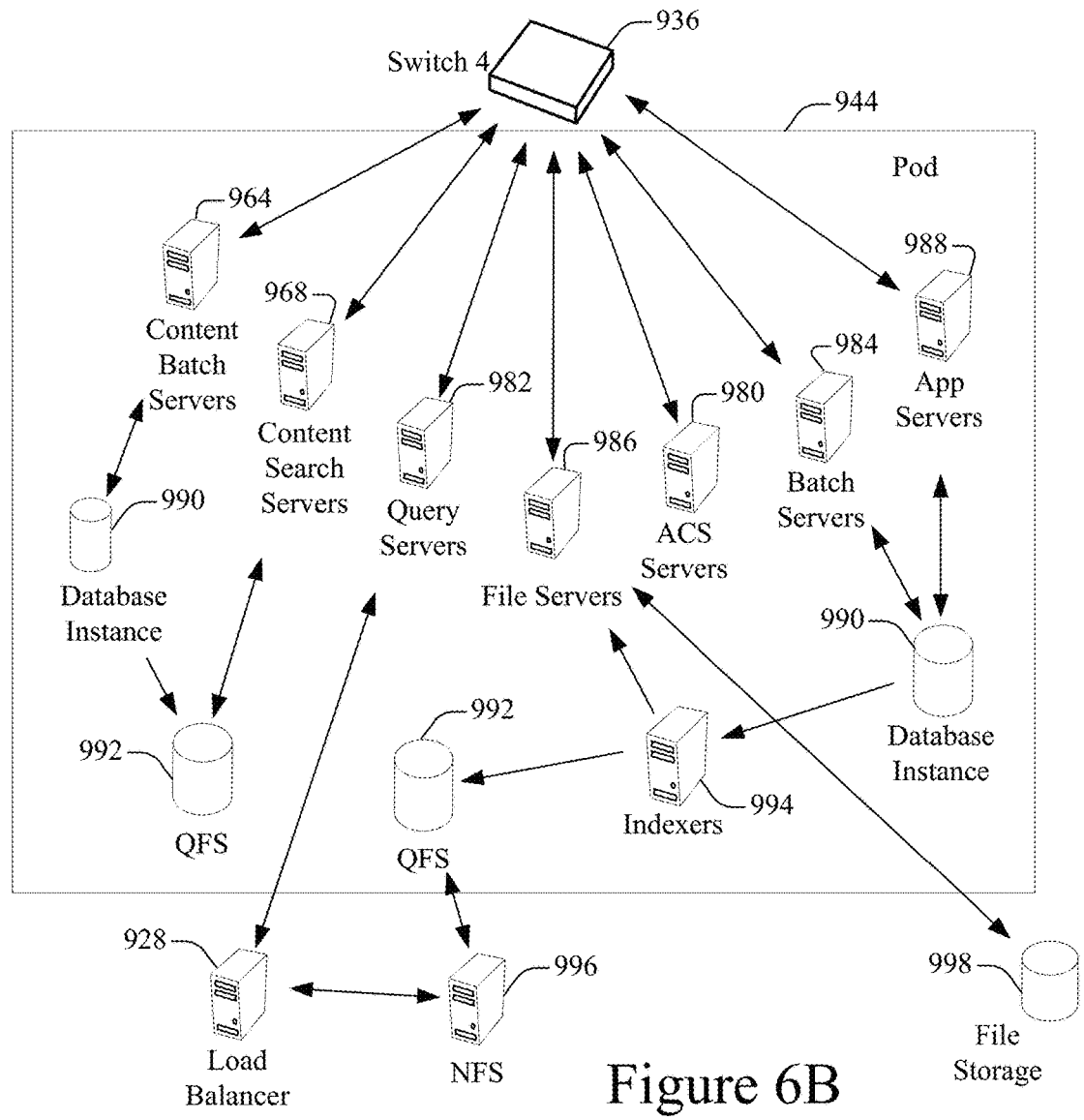
FIG. 6B shows a system diagram further illustrating an example of architectural components of an on-demand database service environment, in accordance with some implementations.

As shown in FIGS. 6A and 6B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 6A and 6B, some implementations of an on-demand database service environment may include anywhere from one to many devices of each type. Also, the on-demand database service environment need not include each device shown in FIGS. 6A and 6B, or may include additional devices not shown in FIGS. 6A and 6B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 6A and 6B.

FIG. 6B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

In some implementations, the app servers 988 may include a hardware and/or software framework dedicated to the execution of procedures (e.g., programs, routines, scripts) for supporting the construction of applications provided by the on-demand database service environment 900 via the pod 944. In some implementations, the hardware and/or software framework of an app server 988 is configured to execute operations of the services described herein, including performance of one or more of the operations of methods described herein with reference to FIGS. 1-4. In alternative implementations, two or more app servers 988 may be included to perform such methods, or one or more other servers described herein can be configured to perform part or all of the disclosed methods.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory ("ROM") devices and random access memory ("RAM") devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A database system for processing keyboard input to cause re-sizing of items in a user interface of a web browser-based application, the database system comprising:
a processor; and
a memory storing instructions configurable to cause the database system to:
cause display of, in a user interface on a display of a device, a bounding window of a web browser, the bounding window comprising a presentation of items, each item being a visual representation of data associated with an object stored in a database of a database system, an outer boundary of a first one of the items being defined at least in part by a first edge, the first edge having a first relative position with respect to other items displayed in the user interface;
process first keyboard input indicating a first one or more keystrokes on a keyboard of the device, the first keyboard input received over a data network from the device;
cause, responsive to processing the first keyboard input, the first edge to be transformed to a re-configurable state;
cause, responsive to the first edge being transformed to the re-configurable state, a source code component of a web page of a web browser-based application to indicate the transformation;
cause, via the source code component, the device to transmit auditory output comprising:
a narration of a first user interaction corresponding to the first keyboard input, and
an instruction to enter further keyboard input to re-size the first item;
process second keyboard input indicating a second one or more keystrokes on the keyboard of the device, the second keyboard input received over the data network from the device; and
cause, responsive to processing the second keyboard input, a size of the first item to be changed by causing the first edge to move from the first relative position to a second relative position with respect to the other items displayed in the user interface.

2. The database system of claim 1, wherein the first item includes a second edge connected with the first edge, the second edge being connected with the first edge at a corner of the first item, the second edge being configured to be transformed to the re-configurable state when the first edge is transformed to the re-configurable state.

3. The database system of claim 2, wherein:
the first item has a rectangular shape,
the first edge is a right edge of the first item, and
the second edge is a bottom edge of the first item.

4. The database system of claim 1,
wherein the instruction to enter further keyboard input comprises an instruction to enter the second keyboard input.

5. The database system of claim 1, wherein the auditory output corresponds to content of the source code component.

6. The database system of claim 5, wherein the source code component is a HyperText Markup Language (HTML) <div> having an aria attribute configured to cause the content to be accessible to a screen reader of the device.

7. The database system of claim 1, wherein:
the first keyboard input corresponds to a spacebar on the keyboard of the device, and
the second keyboard input corresponds to an arrow key on the keyboard of the device.

8. The database system of claim 1, the instructions further configurable to cause the database system to:
cause display of, responsive to processing the first keyboard input, a visual indication in association with a handle of the first edge, the visual indication indicating that the first edge is in the re-configurable state.

9. A method for processing keyboard input to cause re-sizing of items in a user interface of a web browser-based application, the method comprising:
causing display of, in a user interface on a display of a device, a bounding window of a web browser, the bounding window comprising a presentation of items, each item being a visual representation of data associated with an object stored in a database of a database system, an outer boundary of a first one of the items being defined at least in part by a first edge, the first edge having a first relative position with respect to other items displayed in the user interface;

processing first keyboard input indicating a first one or more keystrokes on a keyboard of the device, the first keyboard input received over a data network from the device;

causing, responsive to processing the first keyboard input, the first edge to be transformed to a re-configurable state;

causing, responsive to the first edge being transformed to the re-configurable state, a source code component of a web page of a web browser-based application to indicate the transformation;

causing, via the source code component, the device to transmit auditory output comprising:
a narration of a first user interaction corresponding to the first keyboard input, and
an instruction to enter further keyboard input to re-size the first item;

processing second keyboard input indicating a second one or more keystrokes on the keyboard of the device, the second keyboard input received over the data network from the device; and causing, responsive to processing the second keyboard input, a size of the first item to be changed by causing the first edge to move from the first relative position to a second relative position with respect to the other items displayed in the user interface.

10. The method of claim 9, wherein the first item includes a second edge connected with the first edge, the second edge being connected with the first edge at a corner of the first item, the second edge being configured to be transformed to the re-configurable state when the first edge is transformed to the re-configurable state.

11. The method of claim 10, wherein:
the first item has a rectangular shape,
the first edge is a right edge of the first item, and
the second edge is a bottom edge of the first item.

12. The method of claim 9,
wherein the instruction to enter further keyboard input comprises an instruction to enter the second keyboard input.

13. The method of claim 9, wherein the auditory output corresponds to content of the source code component.

14. The method of claim 13, wherein the source code component is a HyperText Markup Language (HTML) <div> having an aria attribute configured to cause the content to be accessible to a screen reader of the device.

15. The method of claim 9, wherein:
the first keyboard input corresponds to a spacebar on the keyboard of the device, and
the second keyboard input corresponds to an arrow key on the keyboard of the device.

16. A computer program product comprising computer-readable program code capable of being executed by one or more processors when retrieved from a non-transitory computer-readable medium, the program code comprising instructions configurable to cause:
displaying, in a user interface on a display of a device, a bounding window of a web browser, the bounding window comprising a presentation of items, each item being a visual representation of data associated with an object stored in a database of a database system, an outer boundary of a first one of the items being defined at least in part by a first edge, the first edge having a first relative position with respect to other items displayed in the user interface;
processing first keyboard input indicating a first one or more keystrokes on a keyboard of the device, the first keyboard input received over a data network from the device;
transforming, responsive to processing the first keyboard input, the first edge to a re-configurable state;
responsive to the first edge being transformed to the re-configurable state, indicating the transformation using a source code component of a web page of a web browser-based application;
transmitting, by the device and via the source code component, auditory output comprising:
a narration of a first user interaction corresponding to the first keyboard input, and
an instruction to enter further keyboard input to re-size the first item;
processing second keyboard input indicating a second one or more keystrokes on the keyboard of the device, the second keyboard input received over the data network from the device; and
changing, responsive to processing the second keyboard input, a size of the first item by causing the first edge to move from the first relative position to a second relative position with respect to the other items displayed in the user interface.

17. The computer program product of claim 16, wherein the first item includes a second edge connected with the first edge, the second edge being connected with the first edge at a corner of the first item, the second edge being configured to be transformed to the re-configurable state when the first edge is transformed to the re-configurable state.

18. The computer program product of claim 17, wherein:
the first item has a rectangular shape,
the first edge is a right edge of the first item, and
the second edge is a bottom edge of the first item.

19. The computer program product of claim 16,
wherein the instruction to enter further keyboard input comprises an instruction to enter the second keyboard input.

20. The computer program product of claim 16, wherein the auditory output corresponds to content of the source code component.

* * * * *